United States Patent Office 3,086,884
Patented Apr. 23, 1963

3,086,884
METHOD FOR THE PRODUCTION OF A COATED PAPER PRODUCT
Otto Betschmann, Schwendenhaustrasse 17, Zurich-Rehalp, Switzerland
No Drawing. Filed Oct. 12, 1960, Ser. No. 62,078
Claims priority, application Switzerland Oct. 14, 1959
5 Claims. (Cl. 117—76)

The present invention relates to a method for producing a coating on cardboard which is then fabricated into impervious containers for oils and fats.

Various methods have been proposed for making cartons impervious to oils by means of metal foils or foils made of plastic, by applying lacquers of all types, by impregnating with water-soluble substances, such as water glass, gelatin, and the like. It has also previously been known to use casein alone or together with other substances for the production of oil-impermeable coatings on cartons.

Cartons and the like cardboard containers lined with metal or plastic foils, which were found most satisfactory from the standpoint of imperviousness, are presently in commercial use. However, the utilization of these containers is restricted by high production costs. Cartons impregnated with water-soluble substances, with or without the use of casein, have met with little success. This can be attributed to the poor quality of the coating which does not permit storing oils and fats in containers provided with coatings of this type for extended periods.

It is an object of the present invention to provide a highly oil and grease resistant container which is more economical and satisfactory than those heretofore known.

Other objects will be readily apparent to those skilled in the art from the following description and example.

The above objects are accomplished according to the present invention by the step of first providing the container with a film-like lining which is capable of closing the pores and equalizing any surface irregularities and thereafter passing it through a lime casein solution.

The practice of this invention is further illustrated by the following example which is not to be construed as limiting.

The solution of casein and lime is prepared as follows: 4 kg. of casein are introduced into a vessel containing 40 liters of water at 20–25° C. which is equipped with a slowly running stirring device. 500 grams of freshly slaked lime are mixed with 8 liters of water in a separate container and the resulting suspension is heated up to boiling temperature. After reaching the boiling temperature, the lime suspension is admixed, while slowly stirring, with the casein pre-treated in the vessel in the aforesaid manner. The stirring device must move slowly in order to avoid the formation of foam. The mixture, which is allowed to cool in the vessel, slowly assumes the appearance of yellowish honey and, after being cooled in this manner, is ready to serve as a coating bath.

If the dissolving of the casein presents difficulties, it is possible to overcome these by the addition of 100–150 grams of soda.

The impregnation step of this present method is preferably accomplished as follows:

The finished rolls of cardboard, coming from the machine that winds them into tubular shape, are immersed twice in a bath, for example a bath containing a dispersed synthetic resin; the rolls are dried after each immersion and then pulled, 2–3 times through a lime-casein coating bath prepared in the aforesaid manner. It is very important for the carton tubes to be completely dry before each immersion in the bath.

The effect of the dispersion of synthetic resin is primarily that of covering or filling the open pores of the carton in order to prevent the subsequently applied casein-lime dispersion from penetrating into the surfaces thereof.

A wide variety of synthetic resins may be used for this purpose so long as the particular one selected is compatible with the lime-casein coating and the intended end use of the container. In food containers, for example, resins of the general type of vinyl high-polymers may be used. A preferred resin for this purpose is the polyvinyl-acetate resin, available under the trademark "Mowilith."

Upon being immersed in the dispersion of synthetic resin the inside and outside surfaces of the carton are in a condition that will insure uniform adherence of the lime-casein solution and thus a 100% oil impermeability.

After leaving the immersion plant the rolls are passed by means of a conveyor to a machine in which they are closed by having a bottom secured to its end, after which they are ready for filling.

In accordance with a preferred embodiment of the present invention it is possible to use, instead of the dispersion of synthetic resin, a coating prepared from a mixture of chalk and a lime-casein solution. This mixture is prepared, for example, by suspending 2 kg. of powdered chalk in 4 liters of a lime-casein solution.

The mixture prepared in this manner can be applied in the same manner as the dispersion of synthetic resin, i.e. the rolls coming from the tube forming machine are immersed twice in a bath containing chalk and a lime-casein solution, dried after each immersion and then pulled 2–3 times through the ultimate lime-casein coating bath.

By using containers prepared by the method of this invention, it was possible to store oils and greases for periods of more than one year without the containers showing traces of oil or fat permeability.

It should be understood, of course, that the foregoing disclosure relates only to a preferred embodiment of the invention and that it is intended to cover all changes and modifications of the example of the invention herein chosen for the purposes of the disclosure, which do not constitute departures from the spirit and scope of the invention, as set forth in the appended claims.

What is claimed is:

1. Method for preparing an oil and grease proof paper article which comprises forming an article of paper, applying a sizing agent in a liquid vehicle to a paper surface, drying the thus treated paper, thereby removing the vehicle and sizing the surface of said paper to fill the pores and reduce surface irregularities thereof, passing the thus sized paper through a lime-casein coating bath, said bath consisting of casein and lime prepared by mixing 40 parts by weight of casein with 5 parts by weight of lime heated to boiling in an aqueous medium, and drying the coated paper to form an oil impervious coating over the surface thereof.

2. Method according to claim 1 in which the surface is sized with a dispersion of a synthetic resin before the application of the lime-casein solution.

3. A paper container having an oil and grease proof surface coating produced by the method of claim 1.

4. Method for the preparation of an oil and grease-proof paper product which comprises forming an article of paper, passing said article through a sizing bath of chalk suspended in an aqueous lime-casein solution, drying the thus treated article to thereby size the surface thereof, passing the sized article through an aqueous lime-casein coating bath, said coating bath consisting of casein and lime prepared by heating to the boiling temperature 80 parts by weight of casein with one part by weight of lime in an aqueous medium, and drying the thus coated article.

5. A paper container having an oil and grease proof surface coating produced by the method of claim 4.

References Cited in the file of this patent

UNITED STATES PATENTS

| | | |
|---|---|---|
| 1,060,366 | Sadtler | Apr. 29, 1913 |
| 1,999,260 | Schopp | Apr. 30, 1935 |
| 2,656,286 | Fisher | Oct. 20, 1953 |
| 2,875,055 | Griggs et al. | Feb. 24, 1959 |

OTHER REFERENCES

Handbook of Chemistry and Physics, 32nd edition (1950–1951), Chemical Rubber Publishing Co., pages 1467 and 1468 relied upon.